US012647808B2

(12) United States Patent
Pezeshki et al.

(10) Patent No.: US 12,647,808 B2
(45) Date of Patent: Jun. 2, 2026

(54) CHANNEL STATE FEEDBACK WITH DICTIONARY LEARNING

(71) Applicant: QUALCOMM Incorporated, San Diego, CA (US)

(72) Inventors: Hamed Pezeshki, San Diego, CA (US); Arash Behboodi, Amsterdam (NL); Taesang Yoo, San Diego, CA (US); Tao Luo, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 645 days.

(21) Appl. No.: 17/817,304

(22) Filed: Aug. 3, 2022

(65) Prior Publication Data

US 2024/0049023 A1     Feb. 8, 2024

(51) Int. Cl.
*H04W 24/10* (2009.01)
(52) U.S. Cl.
CPC .................................... *H04W 24/10* (2013.01)
(58) Field of Classification Search
CPC ....... H04W 24/10; G06N 3/0455; G06N 3/08; H04L 25/0204; H04L 25/0228; H04L 25/0254
See application file for complete search history.

(56) References Cited

U.S. PATENT DOCUMENTS

| | | | | |
|---|---|---|---|---|
| 2012/0177128 A1* | 7/2012 | Aharon | ................... | H04N 19/97 |
| | | | | 375/240.22 |
| 2017/0091655 A1* | 3/2017 | Lin | ........................ | G06F 9/3836 |
| 2017/0126437 A1 | 5/2017 | Truong et al. | | |
| 2017/0279508 A1 | 9/2017 | Truong et al. | | |
| 2018/0287822 A1* | 10/2018 | Wang | ................... | H04L 25/0202 |
| 2022/0369144 A1* | 11/2022 | Lee | ........................ | H04W 24/10 |
| 2023/0254723 A1* | 8/2023 | Yang | ..................... | H04W 24/02 |
| | | | | 370/252 |
| 2024/0137082 A1* | 4/2024 | Shi | ........................ | H04B 7/0456 |

OTHER PUBLICATIONS

Alevizos P.N., et al., "Limited Feedback Channel Estimation in Massive MIMO with Non-uniform Directional Dictionaries", Arxiv. Org, Cornell University Library, 201 Olin Library Cornell University Ithaca, NY 14853, Dec. 29, 2017, 14 Pages, XP081091046, abstract, figure 1, Section III, Section IV, Section V, Algorithm 3. International Search Report and Written Opinion—PCT/US2023/071187—ISA/EPO—Oct. 25, 2023.

(Continued)

*Primary Examiner* — Sun Jong Kim
(74) *Attorney, Agent, or Firm* — ArentFox Schiff, LLP

(57) ABSTRACT

In a wireless communication system, a user equipment (UE) may report channel state information (CSI) using a learned dictionary defining a set of sparse vectors. The UE determines a learned dictionary for CSI reporting. For example, the UE receives a shared dictionary from a similar and nearby UE or the UE trains the learned dictionary based on logged CSI measurements. The UE indicates the learned dictionary to a serving base station. The UE measures CSI for a plurality of channels. The UE reports a sparse vector representing the CSI based on the learned dictionary to the serving base station.

16 Claims, 11 Drawing Sheets

1100

1110
Transmit a stopping criterion to the UE for use in iterative hard thresholding to train the learned dictionary 1120
Receive an indication of a learned dictionary for CSI reporting from a UE, the learned dictionary defining sparse vectors 1122
Receive a value of s when the sparse vector is s-sparse 1130
Receive, from the UE, a sparse vector representing CSI measured at the UE 1132
Receive indices of non-zero elements of the sparse vector and corresponding quantized values 1140
Share the learned dictionary with a similar UE 1150
Determine an estimated channel based on the sparse vector and the learned dictionary for the UE

(56) References Cited

OTHER PUBLICATIONS

Mohades Z., et al., "Deep Neural Network for Compressive Sensing and Application to Massive MIMO Channel Estimation", Circuits, Systems and Signal Processing, Cambridge, MS, US, vol. 40, No. 9, Mar. 9, 2021, pp. 4474-4489, XP037528052, Sections 1-4.

Kramer M.A., "Nonlinear Principal Component Analysis Using Autoassociative Neural Networks", American Institute of Chemical Engineers Journal, vol. 37, No. 2, Feb. 1991, pp. 233-243.

Ma Z., et al., "Sparse Principal Component Analysis and Iterative Thresholding", The Annals of Statistics, vol. 41, No. 2, Apr. 2013, pp. 772-801.

Wen C-K., et al., "Deep Learning for Massive MIMO CSI Feedback", IEEE Wireless Communications Letters, vol. 7, No. 5, Oct. 2018, pp. 748-751.

* cited by examiner

700
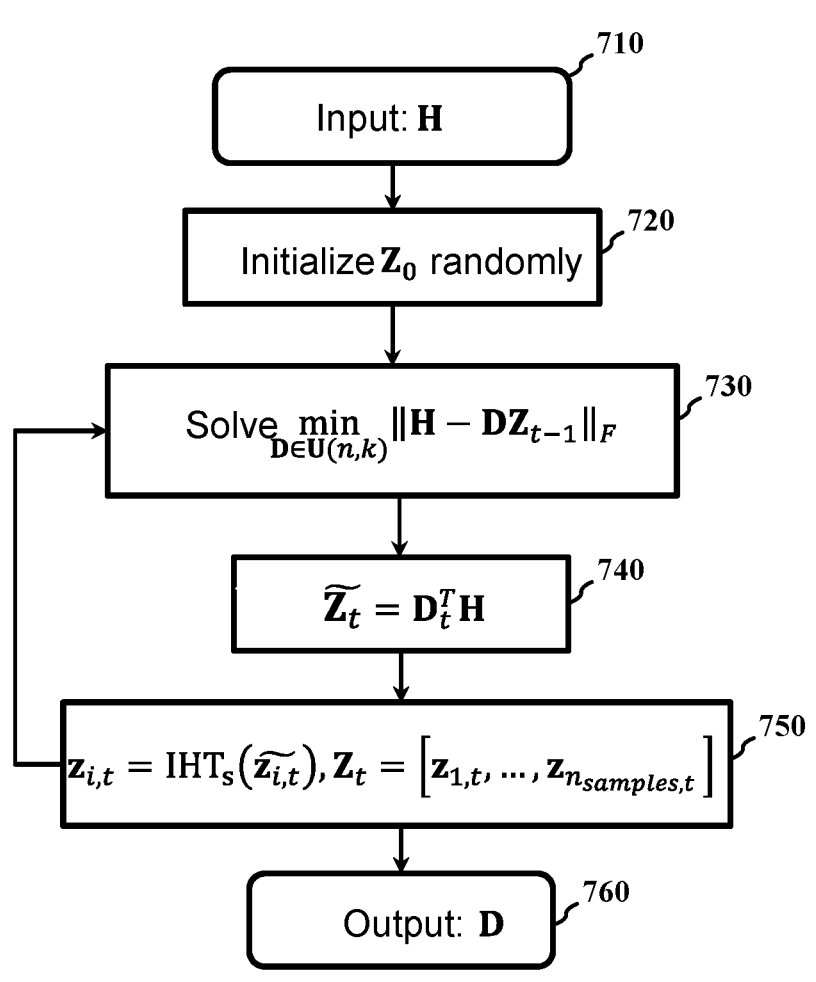
FIG. 7

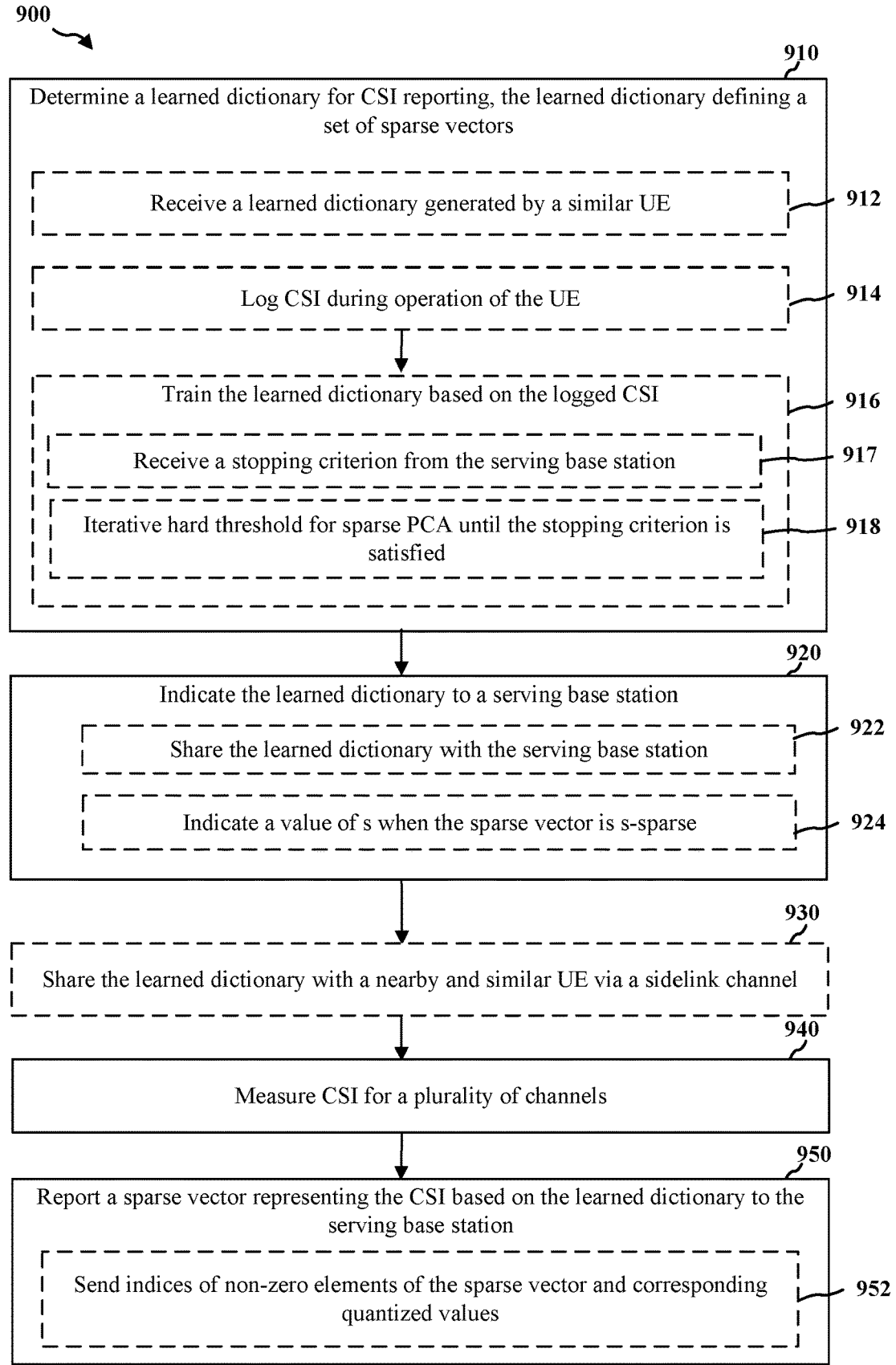

910

Determine a learned dictionary for CSI reporting, the learned dictionary defining a set of sparse vectors Receive a learned dictionary generated by a similar UE    912

Log CSI during operation of the UE    914

Train the learned dictionary based on the logged CSI    916

Receive a stopping criterion from the serving base station    917

Iterative hard threshold for sparse PCA until the stopping criterion is satisfied    918

920

Indicate the learned dictionary to a serving base station

Share the learned dictionary with the serving base station    922

Indicate a value of s when the sparse vector is s-sparse    924

930

Share the learned dictionary with a nearby and similar UE via a sidelink channel

940

Measure CSI for a plurality of channels

950

Report a sparse vector representing the CSI based on the learned dictionary to the serving base station Send indices of non-zero elements of the sparse vector and corresponding quantized values    952

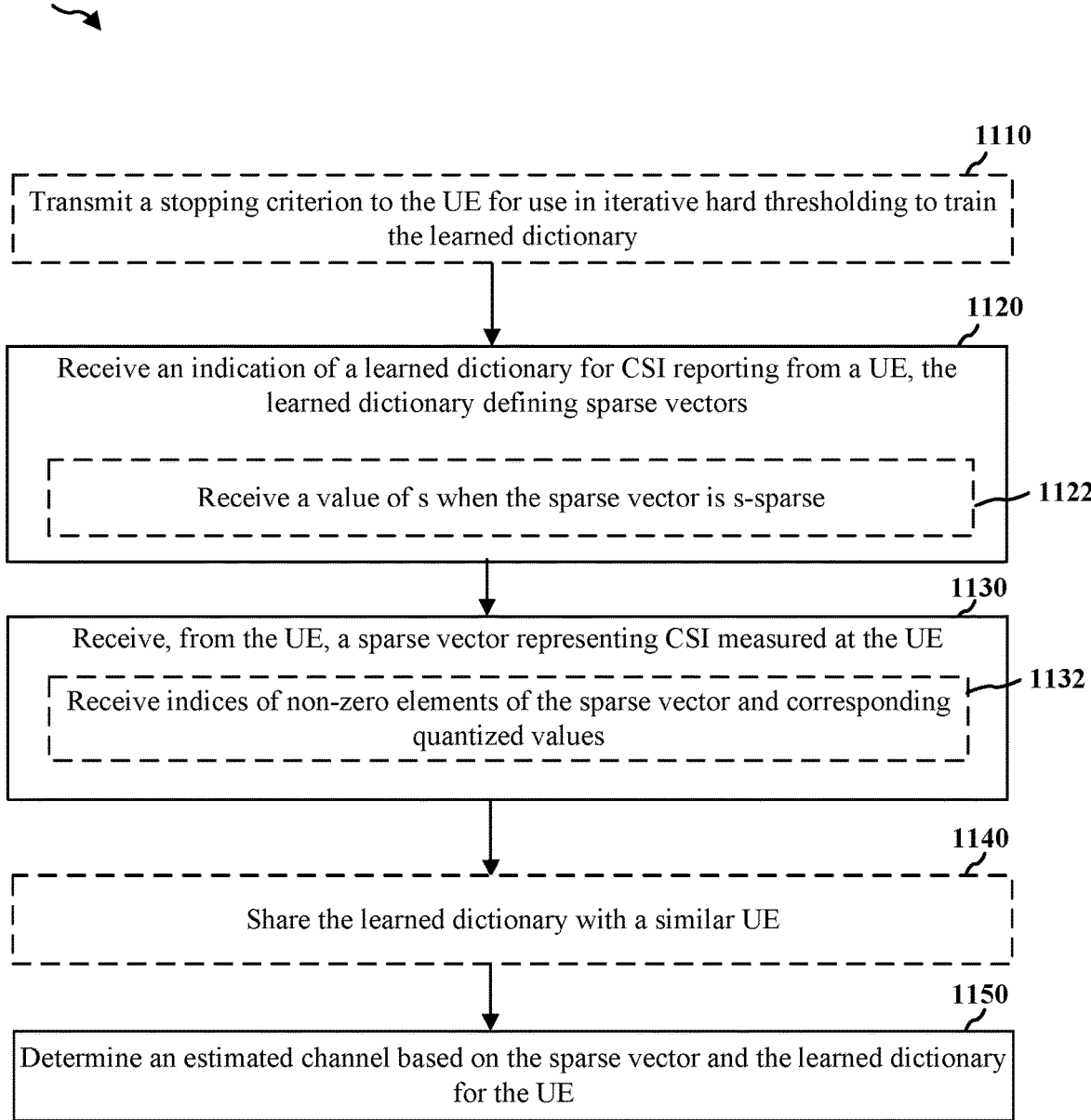

1110

Transmit a stopping criterion to the UE for use in iterative hard thresholding to train the learned dictionary

1120

Receive an indication of a learned dictionary for CSI reporting from a UE, the learned dictionary defining sparse vectors Receive a value of s when the sparse vector is s-sparse    1122

1130

Receive, from the UE, a sparse vector representing CSI measured at the UE

Receive indices of non-zero elements of the sparse vector and corresponding quantized values    1132

1140

Share the learned dictionary with a similar UE

1150

Determine an estimated channel based on the sparse vector and the learned dictionary for the UE

FIG. 11

CHANNEL STATE FEEDBACK WITH DICTIONARY LEARNING

BACKGROUND

Technical Field

The present disclosure relates generally to communication systems, and more particularly, channel state feedback utilizing dictionary learning.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method of wireless communication for a user equipment (UE), including: determining a learned dictionary for channel state information (CSI) reporting, the learned dictionary defining a set of sparse vectors; indicating the learned dictionary to a serving base station; measuring CSI for a plurality of channels; and reporting a sparse vector representing the CSI based on the learned dictionary to the serving base station.

In some aspects, the techniques described herein relate to a method, wherein determining the learned dictionary includes receiving a learned dictionary generated by a similar UE.

In some aspects, the techniques described herein relate to a method, wherein the similar UE is a same model as the UE and the learned dictionary is for a location within a threshold distance of the UE.

In some aspects, the techniques described herein relate to a method, wherein determining the learned dictionary includes: logging CSI during operation of the UE; and training the learned dictionary based on the logged CSI.

In some aspects, the techniques described herein relate to a method, wherein training the learned dictionary based on the logged CSI includes iterative hard thresholding for sparse principal component analysis (PCA) until a stopping criterion is satisfied.

In some aspects, the techniques described herein relate to a method, further including receiving the stopping criterion from the serving base station.

In some aspects, the techniques described herein relate to a method, wherein indicating the learned dictionary to the serving base station includes sharing the learned dictionary with the serving base station.

In some aspects, the techniques described herein relate to a method, further including sharing the learned dictionary with a nearby and similar UE via a sidelink channel.

In some aspects, the techniques described herein relate to a method, wherein reporting the sparse vector includes sending indices of non-zero elements of the sparse vector and corresponding quantized values.

In some aspects, the techniques described herein relate to a method, wherein indicating the learned dictionary includes indicating a value of s when the sparse vector is s-sparse.

In some aspects, the techniques described herein relate to a method of wireless communication for a base station, including: receiving an indication of a learned dictionary for channel state information (CSI) reporting from a user equipment (UE), the learned dictionary defines sparse vectors; receiving, from the UE, a sparse vector representing CSI measured at the UE; and determining an estimated channel based on the sparse vector and the learned dictionary for the UE.

In some aspects, the techniques described herein relate to a method, further including sharing the learned dictionary with a similar UE.

In some aspects, the techniques described herein relate to a method, wherein the similar UE is a same model as the UE and the learned dictionary is for a location within a threshold distance of the UE.

In some aspects, the techniques described herein relate to a method, further including transmitting a stopping criterion to the UE for use in iterative hard thresholding to train the learned dictionary.

In some aspects, the techniques described herein relate to a method, wherein receiving the sparse vector includes receiving indices of non-zero elements of the sparse vector and corresponding quantized values.

In some aspects, the techniques described herein relate to a method, wherein receiving the indication of the learned dictionary includes receiving a value of s when the sparse vector is s-sparse.

In some aspects, the techniques described herein relate to an apparatus of a user equipment (UE), including: a memory storing computer-executable instructions; and at least one processor coupled to the memory and configured to execute the computer-executable instructions to: determine a learned dictionary for channel state information (CSI) reporting, the learned dictionary defining a set of sparse vectors; indicate the learned dictionary to a serving base station; measure CSI for a plurality of channels; and report a sparse vector representing the CSI based on the learned dictionary to the serving base station.

In some aspects, the techniques described herein relate to an apparatus, wherein to determine the learned dictionary the at least one processor is configured to receive a learned dictionary generated by a similar UE.

In some aspects, the techniques described herein relate to an apparatus, wherein the similar UE is a same model as the UE and the learned dictionary is for a location within a threshold distance of the UE.

In some aspects, the techniques described herein relate to an apparatus, wherein to determine the learned dictionary, the at least one processor is configured to: log CSI during operation of the UE; and train the learned dictionary based on the logged CSI.

In some aspects, the techniques described herein relate to an apparatus, wherein to train the learned dictionary based on the logged CSI, the at least one processor is configured to perform iterative hard thresholding for sparse principal component analysis (PCA) until a stopping criterion is satisfied.

In some aspects, the techniques described herein relate to an apparatus, wherein the at least one processor is configured to receive the stopping criterion from the serving base station.

In some aspects, the techniques described herein relate to an apparatus, wherein to indicate the learned dictionary to the serving base station, the at least one processor is configured to share the learned dictionary with the serving base station.

In some aspects, the techniques described herein relate to an apparatus, wherein the at least one processor is configured to share the learned dictionary with a nearby and similar UE via a sidelink channel.

In some aspects, the techniques described herein relate to an apparatus, wherein to reporting the sparse vector, the at least one processor is configured to send indices of non-zero elements of the sparse vector and corresponding quantized values.

In some aspects, the techniques described herein relate to an apparatus, wherein to indicate the learned dictionary, the at least one processor is configured to indicating a value of s when the sparse vector is s-sparse.

In some aspects, the techniques described herein relate to an apparatus of wireless communication for a base station, including: a memory storing computer-executable instructions; and at least one processor coupled to the memory and configured to execute the computer-executable instructions to: receive an indication of a learned dictionary for channel state information (CSI) reporting from a user equipment (UE), the learned dictionary defines sparse vectors; receive, from the UE, a sparse vector representing CSI measured at the UE; and determine an estimated channel based on the sparse vector and the learned dictionary for the UE.

In some aspects, the techniques described herein relate to an apparatus, wherein the at least one processor is configured to share the learned dictionary with a similar UE.

In some aspects, the techniques described herein relate to an apparatus, wherein the at least one processor is configured to transmit a stopping criterion to the UE for use in iterative hard thresholding to train the learned dictionary.

In some aspects, the techniques described herein relate to an apparatus, wherein to receive the sparse vector, the at least one processor is configured to receive indices of non-zero elements of the sparse vector and corresponding quantized values.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a flow diagram of an example method for learning a dictionary.

FIG. 8 is a conceptual data flow diagram illustrating the data flow between different means/components in an example UE.

FIG. 9 is a flowchart of an example method for channel state feedback reporting using a learned dictionary.

FIG. 10 is a conceptual data flow diagram illustrating the data flow between different means/components in an example UE.

FIG. 11 is a flowchart of an example method for channel state feedback reporting using a learned dictionary.

DETAILED DESCRIPTION

Figure 1:
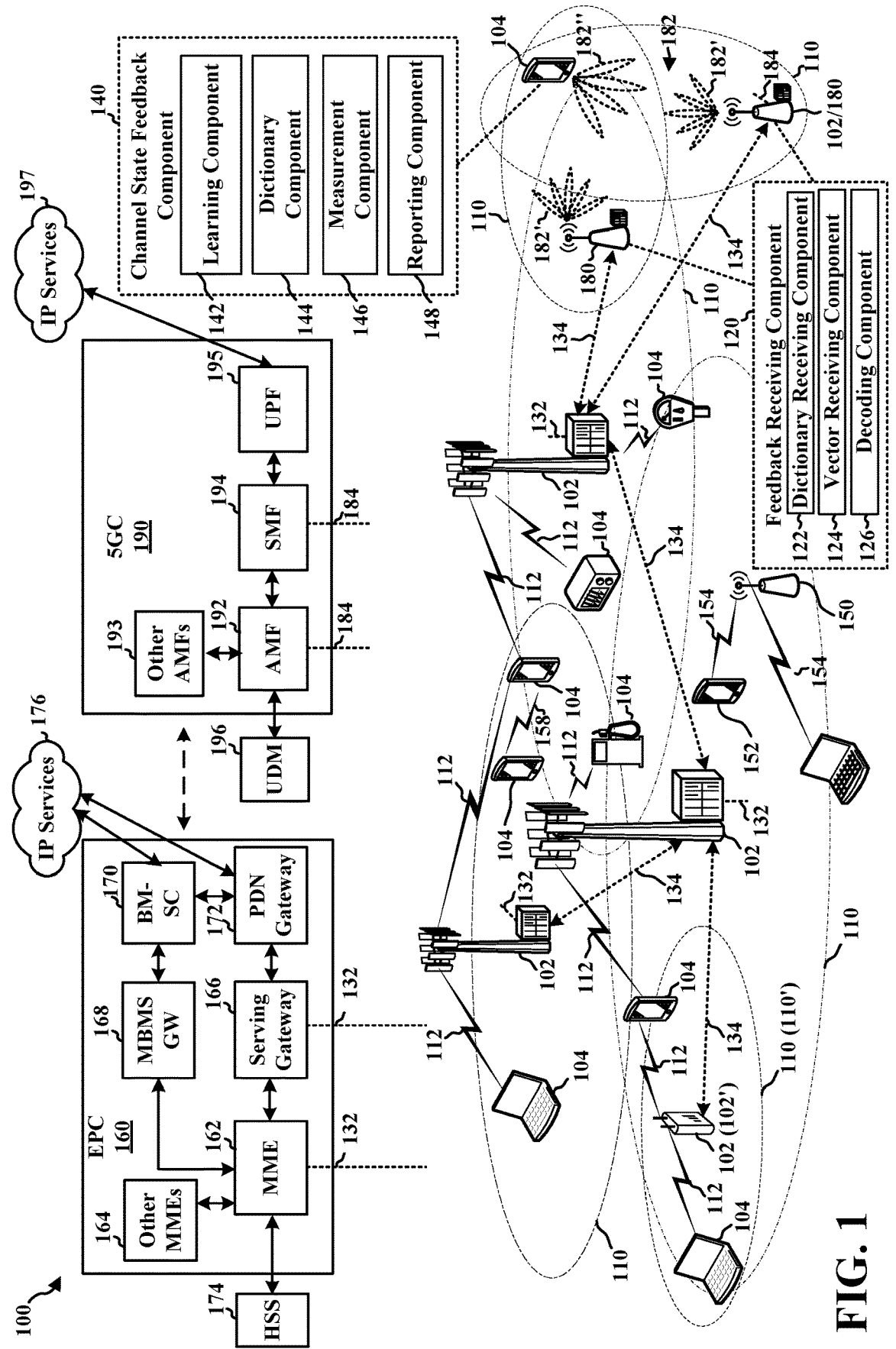
FIG. 1 is a diagram illustrating an example of a wireless communications system including an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

In a wireless communication system, channel state feedback (CSF) may be used to determine transmission properties. For example, a user equipment (UE) may transmit channel state information (CSI) to a base station. The CSI may be used by the base station to select downlink transmission properties. The CSI may also be used to schedule the UE for uplink transmissions.

Multiple-input multiple-output (MIMO) antenna technology may increase the dimensionality of CSI. For example, the channel between each pair of antennas may vary. Accordingly, as the number of antennas used in MIMO increases, the overhead to report CSI may also increase. Various techniques have been proposed to reduce CSI overhead such as codebook-based reporting. Predefined codebooks, however, may reduce the granularity of CSI information. Another proposal for CSI feedback is the use of machine-learning algorithms to compress CSI at the UE and decompress the CSI at the base station. Such proposals are expected to provide gain in feedback accuracy versus payload size.

In an aspect, the present disclosure provides techniques for using dictionary learning to compress CSI information. A UE may determine a learned dictionary that defines a set of sparse vectors for CSI reporting. For example, the UE may train the learned dictionary based on CSI logged at the UE or the UE may receive a shared dictionary learned at a similar UE. The UE may indicate the learned dictionary to a serving base station. The UE may measure CSI for a plurality of channels. The UE may report a sparse vector representing the CSI based on the learned dictionary to the servicing base station.

In an aspect, because the learned dictionary is specific to the channel conditions on which it is trained, the learned dictionary may provide gains in feedback accuracy versus payload size. For example, a sparse vector may be efficiently transmitted by identifying indices of non-zero elements and corresponding quantized values. Further, the training process may be based on a stopping criterion that defines the feedback accuracy, which may be greater than codebook based feedback. Although a learned dictionary may involve training at a UE, which places a computation burden on the UE, the training may occur when the UE is charging so as not to deplete battery power. Additionally, in some implementations, the learned dictionary may be shared among similar UEs such that a training process does not need to be repeated at each UE.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. Non-transitory computer-readable media specifically excludes transitory signals. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The macrocells include base stations. The small cells include femtocells, picocells, and microcells.

One or more of the UEs 104 may include a channel state feedback component 140 that utilizes a learned dictionary to transmit CSI information as a sparse vector. The channel state feedback component 140 may include a learning component 142 configured to determine a learned dictionary for CSI reporting. The learned dictionary defines a set of sparse vectors. The channel state feedback component 140 may include a dictionary component 144 configured to transmit the learned dictionary to a serving base station. The channel state feedback component 140 may include a measurement component 146 configured to measure CSI for a plurality of channels. The channel state feedback component 140 may include a reporting component 148 configured to report a sparse vector representing the CSI based on the learned dictionary to the serving base station In an aspect, one or more of the base stations 102 may include a feedback receiving component 120 that utilizes the learned dictionary to receive the sparse vector indicating CSI information. For example, the feedback receiving component 120 may include a dictionary receiving component 122 configured to receive a learned dictionary for channel state information (CSI) reporting from a user equipment (UE). The learned dictionary may define sparse vectors. The feedback receiving component 120 may include a vector receiving component 122 configured to receive, from the UE, a sparse vector representing CSI measured at the UE. The feedback receiving component 120 may include a decoding component 126 configured to determine an estimated channel based on the sparse vector and the learned dictionary for the UE.

he base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 one or more transmit beams 182'. The UE 104 may receive the beamformed signal from the base station 180 on one or more receive beams 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. In the case of a synchronous network, cells from base stations 180 may be generally aligned. A different receive beam 182″ may provide the best performance for each cell. A UE may perform a neighbor cell search and beam measurements to identify the best receive beam 182″ for each cell.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B, 2C, 2D:
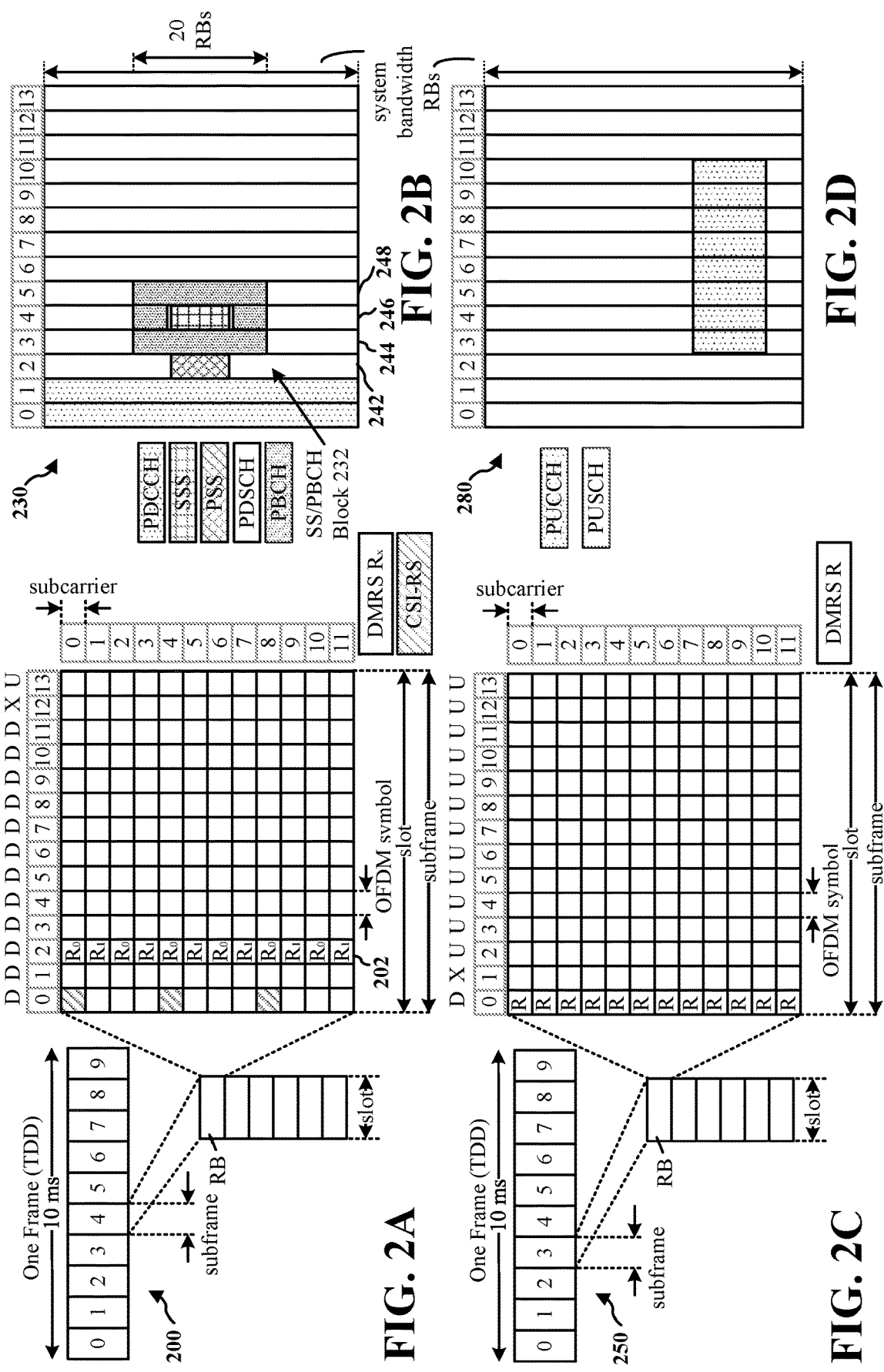
FIG. 2A is a diagram illustrating an example of a first frame, in accordance with certain aspects of the present description.
FIG. 2B is a diagram illustrating an example of downlink (DL) channels within a subframe, in accordance with certain aspects of the present description.
FIG. 2C is a diagram illustrating an example of a second frame, in accordance with certain aspects of the present description.
FIG. 2D is a diagram illustrating an example of uplink (UL) channels within a subframe, in accordance with certain aspects of the present description.

FIGS. 2A-2D are resource diagrams illustrating example frame structures and channels that may be used for uplink, downlink, and sidelink transmissions to a UE 104 including a channel state feedback 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=0 with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RB s (PRB s)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) 202 (indicated as Rx for one particular configuration, where 100x is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 (e.g., a PSS symbol 242) of particular subframes of a frame. The PSS is used by a UE 104 to determine subframe/symbol timing and a physical layer identity. A secondary synchronization signal (SSS) may be within symbol 4 (e.g., a SSS symbol 246) of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS 202. The physical broadcast channel (PBCH), which carries a master information block (MIB), may be logically grouped with the PSS and SSS to form a synchronization signal (SS)/PBCH block, also referred to as an SSB 232. The PBCH may be transmitted over symbols 3-5 of a subframe, with symbols 3 and 5, for example, being referred to as PBCH symbols 244, 248 because those symbols include mostly RBs for the PBCH. The DMRS 202 may be interleaved with the RBs for the PBCH (e.g., every fourth RB) to allow decoding of the PBCH. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
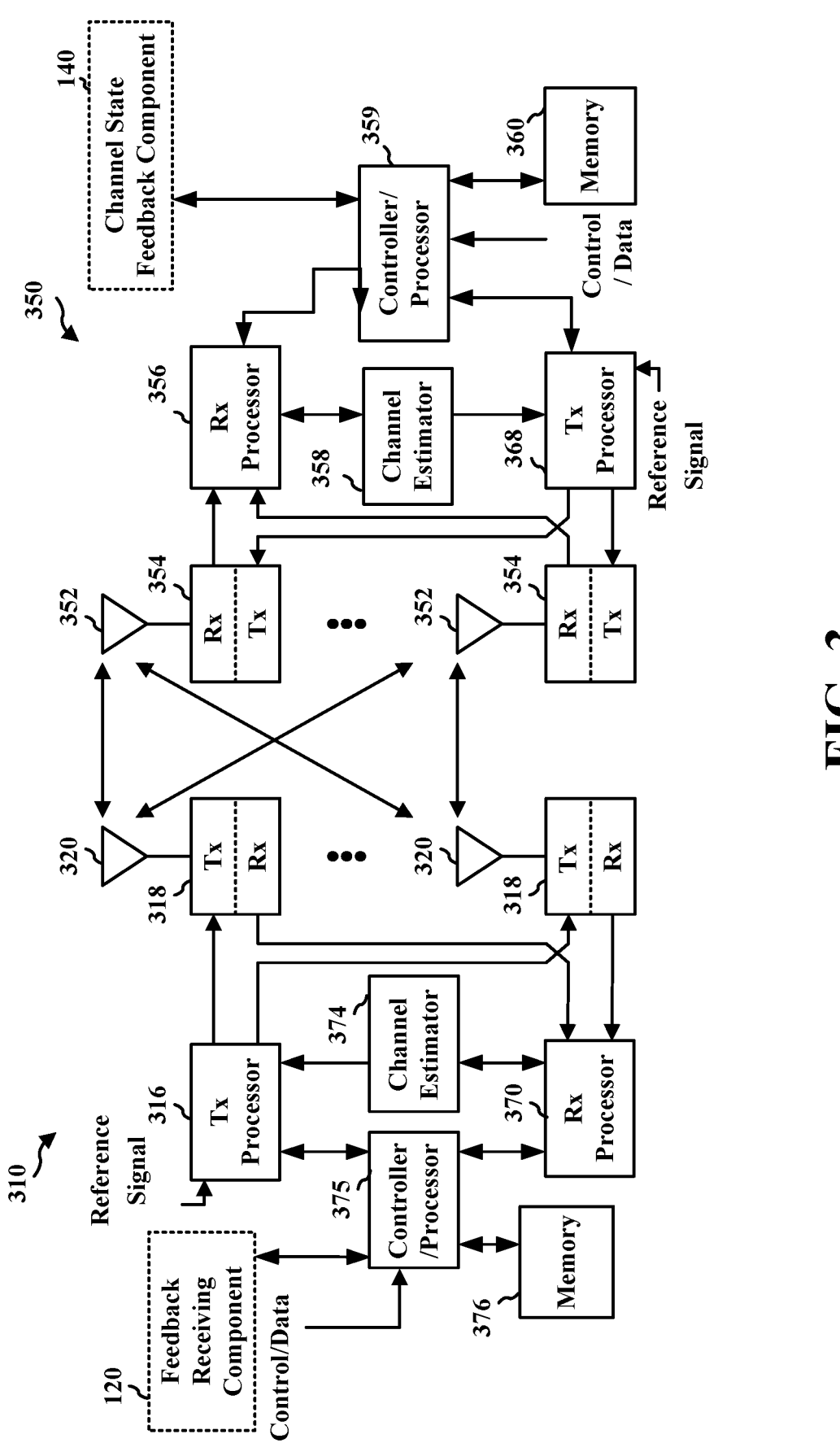
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate an RF carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the channel state feedback component 140 of FIG. 1.

At least one of the Tx processor 316, the Rx processor 370, and the controller/processor 375 may be configured to perform aspects in connection with the feedback receiving component 120 of FIG. 1.

Figure 4:
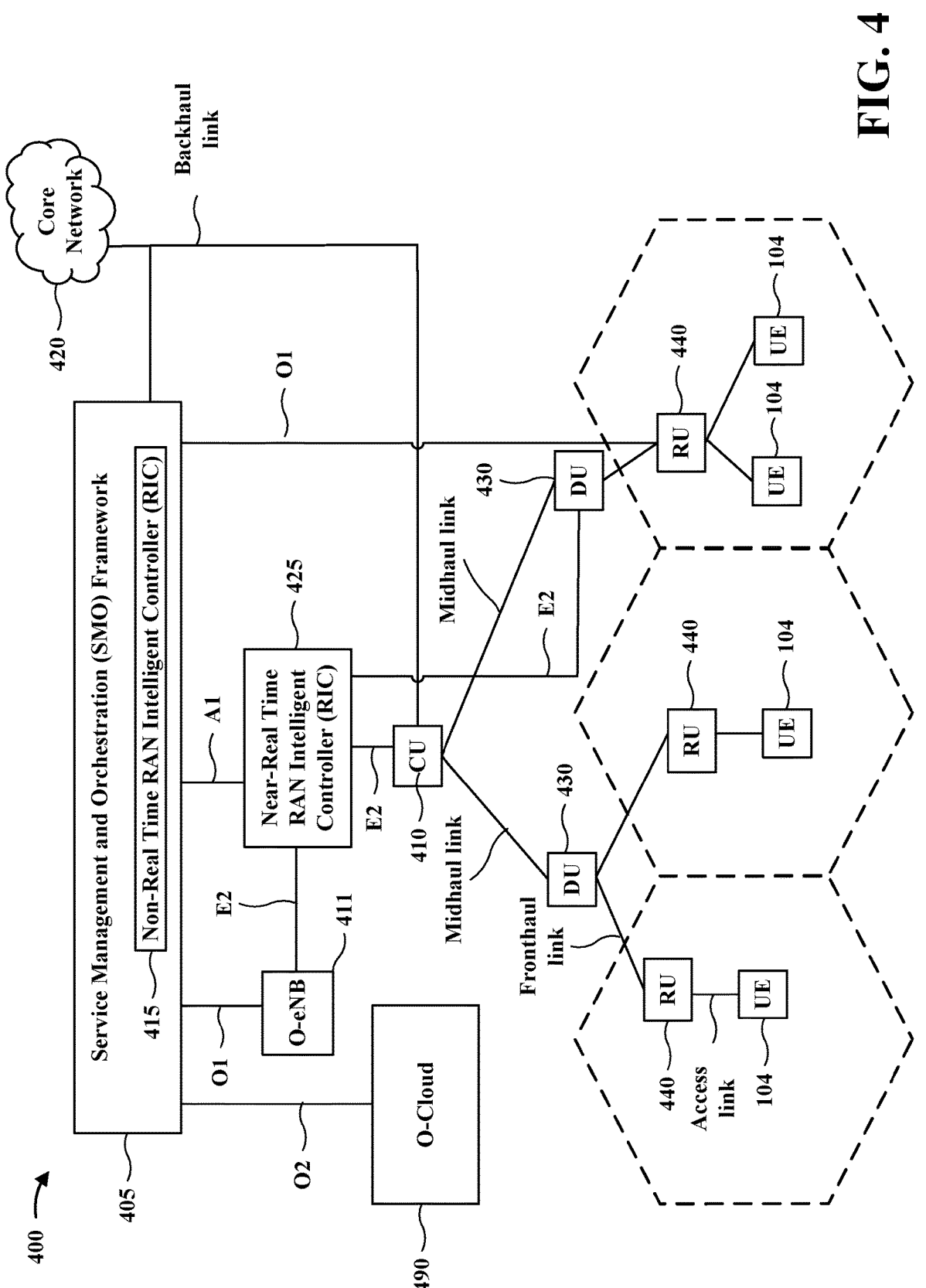
FIG. 4 is a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
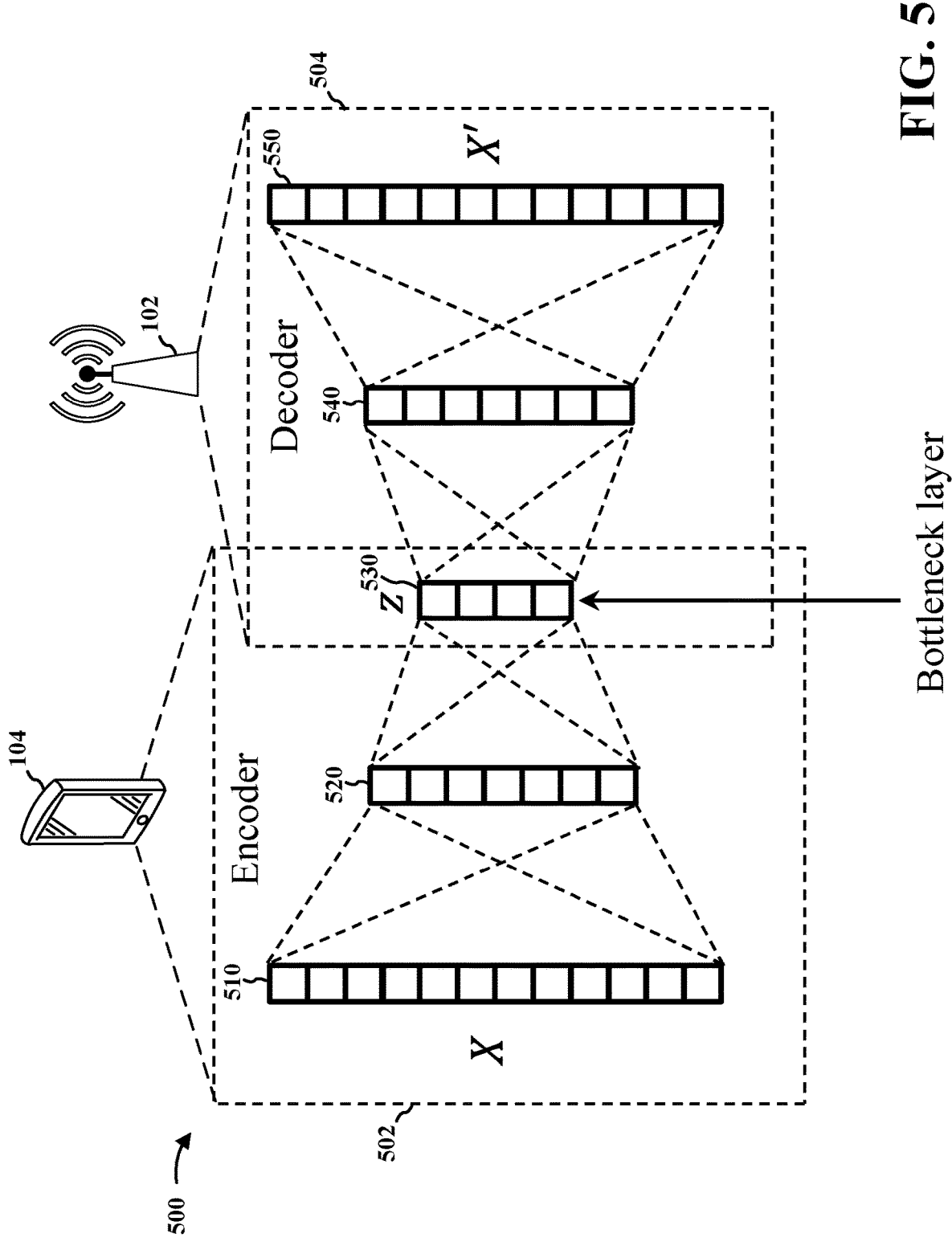
FIG. 5 is a diagram of an example autoencoder for channel state information (CSI) feedback.

FIG. 5 is a diagram of an example autoencoder 500 for CSI feedback. The autoencoder 500 may include an encoder network 502 at a UE 104 and a decoder network 504 at a base station 102. The encoder network 502 and decoder network 504 are trained jointly but deployed separately. For instance, the encoder network 502 and the decoder network 504 may be implemented in the UE 104 and base station 102, respectively, or vice versa. The autoencoder 500 is a non-supervised learning algorithm in which the encoder network 502 tries to come up with a lower-dimensional representation z of the input X, and the decoder network 504 tries to reconstruct the input X from z. For example, the encoder network 502 may be a first neural network including an input layer 510 that receives the input X, one or more hidden layers 520, and a bottleneck layer 530. The bottleneck layer 530 may have a smaller dimensionality than the input layer X. For example, the input layer X may include a channel estimate for each pair of receive antenna and transmit antenna, possibly for multiple sub-bands, whereas the bottleneck layer or the representation z may be a one-dimensional vector. The decoder network 504 may also be a neural network. The decoder network 504 may include the bottleneck layer 530 as an input layer, one or more hidden layers 540, and an output layer 550.

Proposals for CSI feedback based on ML models have been focused on autoencoders such as the autoencoder 500. Autoencoders may outperform conventional approaches such as compressed sensing in some scenarios, e.g., low compression ratios. Autoencoders try to learn the compressed representation from the training data and therefore they try to tailor compression for that specific type of data. One issue for use of autoencoders is complexity of a signaling framework through which Tx and Rx can interact for ML module update, parameter exchange, and/or joint training.

Figure 6:
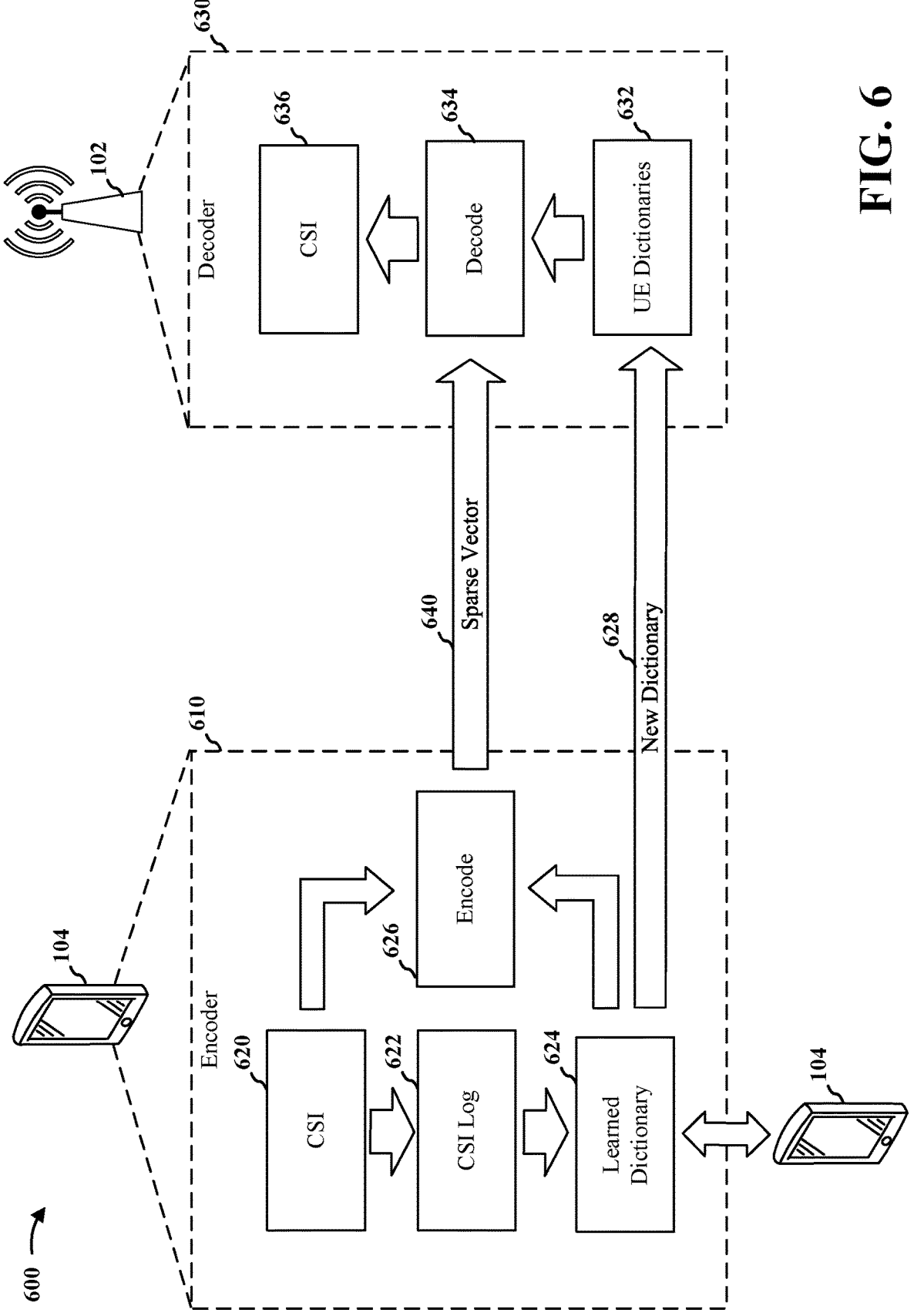
FIG. 6 is a diagram of an example CSI encoder and decoder using a learned dictionary.

FIG. 6 is a diagram 600 of an example CSI encoder 610 and decoder 630 using a learned dictionary 624. The learned dictionary 624 may be applicable for a single base station 102 and one or more UEs 104. The encoder 610 may select the learned dictionary 624. In some implementations, the encoder 610 may receive the learned dictionary 624 from another UE 104, for example, via sidelink communications.

In some implementations, the encoder 610 may train the learned dictionaries 624 based on measured CSI. For example, during a training stage, the encoder 610 and/or measurement component 146 may measure CSI for a plurality of channels. The encoder 610 may store the measured CSI in a CSI log 622. For example, the CSI log 622 may store CSI with associated side-information such as the cell, geographic location, and time of day the CSI is measured. The geographic location may be a zone within a cell. As discussed in further detail below with respect to FIG. 7, the encoder 610 and/or learning component 144 may train the learned dictionary 624, for example, using iterative hard thresholding. The encoder 610 and/or dictionary component 144 may transmit the learned dictionary 624 to the base station 102. For example, the learned dictionary 624 (e.g., new dictionary 628) may be transmitted as an RRC information element or MAC-CE. During an inference stage, the encoder 610 may perform an encode operation 626 on a CSI 620 measured by the measurement component 146. For example, encoding a CSI may include applying the CSI to the learned dictionary (e.g., via matrix operations including matrix multiplication) to determine a sparse vector 640. The encoder 610 and/or reporting component 148 may transmit the sparse vector 640 to the base station 102. For example, the sparse vector 640 may be transmitted on a PUCCH or PUSCH as uplink control information (UCI). The sparse vector 640 may be efficiently transmitted by identifying the indices of the non-zero elements and a quantized value. In some implementations, a first non-zero element may be identified by index and subsequent non-zero elements may be identified based on a difference from the previous non-zero element.

The decoder 630 may receive the new dictionary 628 and store the new dictionary 628 in a set of UE dictionaries 632. In some implementations, the UE dictionaries 632 may associate an identifier with each dictionary and track an active dictionary for each UE. For instance, a UE may switch between dictionaries as the UE changes geographic locations defined by zones (e.g., indoor and outdoor). The UE dictionaries 632 may provide the current dictionary to a decode operation 634. The decode operation 634 may receive the sparse vector 640. The decode operation 634 may decode the sparse vector by applying the sparse vector to the current dictionary for the UE. For instance, the decode operation 634 may include multiplying the learned dictionary with the sparse vector to reconstruct the CSI information. The decode operation 634 may output a CSI 636 including a channel estimation for each of the plurality of channels.

FIG. 7 is a flow diagram of an example method 700 for learning a dictionary. The method 700 may be performed by the learning component 142 to train a learned dictionary 624. Generally, the method 700 may utilize an iterative hard thresholding approach.

At block 710, the method 700 may including receiving an input H, where H is a data set matrix of samples (e.g., samples of channel estimates). That is, $H = [h_1 \ldots h_{n_{samples}}] \in \mathbb{C}^{n \times n_{samples}}$. The goal of the dictionary learning method 700 is to learn a dictionary D with k atoms. $D = [d_1 \ldots d_k] \in \mathbb{C}^{n \times k}$ such that $[h_1 \ldots h_{n_{samples}}] = [d_1 \ldots d_k][z_1 \ldots z_{n_{samples}}]$ and $z_i$'s are sparse. The general problem may be to minimize an absolute value of a difference between H and DZ subject to a constraint that. That is:

$$\min_{DZ} \|H - DZ\|_F \text{ s.t. } D^T D = I, Z \in \mathbb{C}^{k \times n_{samples}},$$

$$\|z_i\|_0 \leq s, i \in \{1, \ldots, n_{samples}\}.$$

In some implementations, the constraint $D^T D = I$ may be substituted with another suitable condition such as $\|D\|_F = 1$.

At block 720, $Z_0$ may be initialized randomly. The general problem may then be solved using iterative hard threshold for principal components analysis.

At block 730, the learning component 142 may update D by solving the following problem, which may be referred to as an orthogonal Procrustes problem.

$$\min_{D \in U(n,k)} \|H - DZ_{t-1}\|_F$$

The orthogonal Procrustes problem may be solved with a closed form solution using single variable decomposition.

At block 740, the learning component 142 may update Z based on $$\tilde{Z}_t = D_t^T H.$$

The learning component 142 may solve $$\min_z \|H - D_t Z\|_F.$$

At block 750, the learning component 142 may use iterative hard thresholding on Z. $z_{i,t} = IHT_s(\tilde{z}_{i,t})$, $Z_t = [z_{1,t}, \ldots, z_{n_{samples},t}]$. The blocks 730, 740, and 750 may be repeated until a stopping criterion is satisfied. For example, the stopping criterion may be that a mean square error difference between a training set and validation set is less than a threshold. In some implementations, the stopping criterion (e.g., the threshold) may be configured by the base station 102.

At block 760, the learning component 142 may output the dictionary D as the learned dictionary 624.

Figure 8:
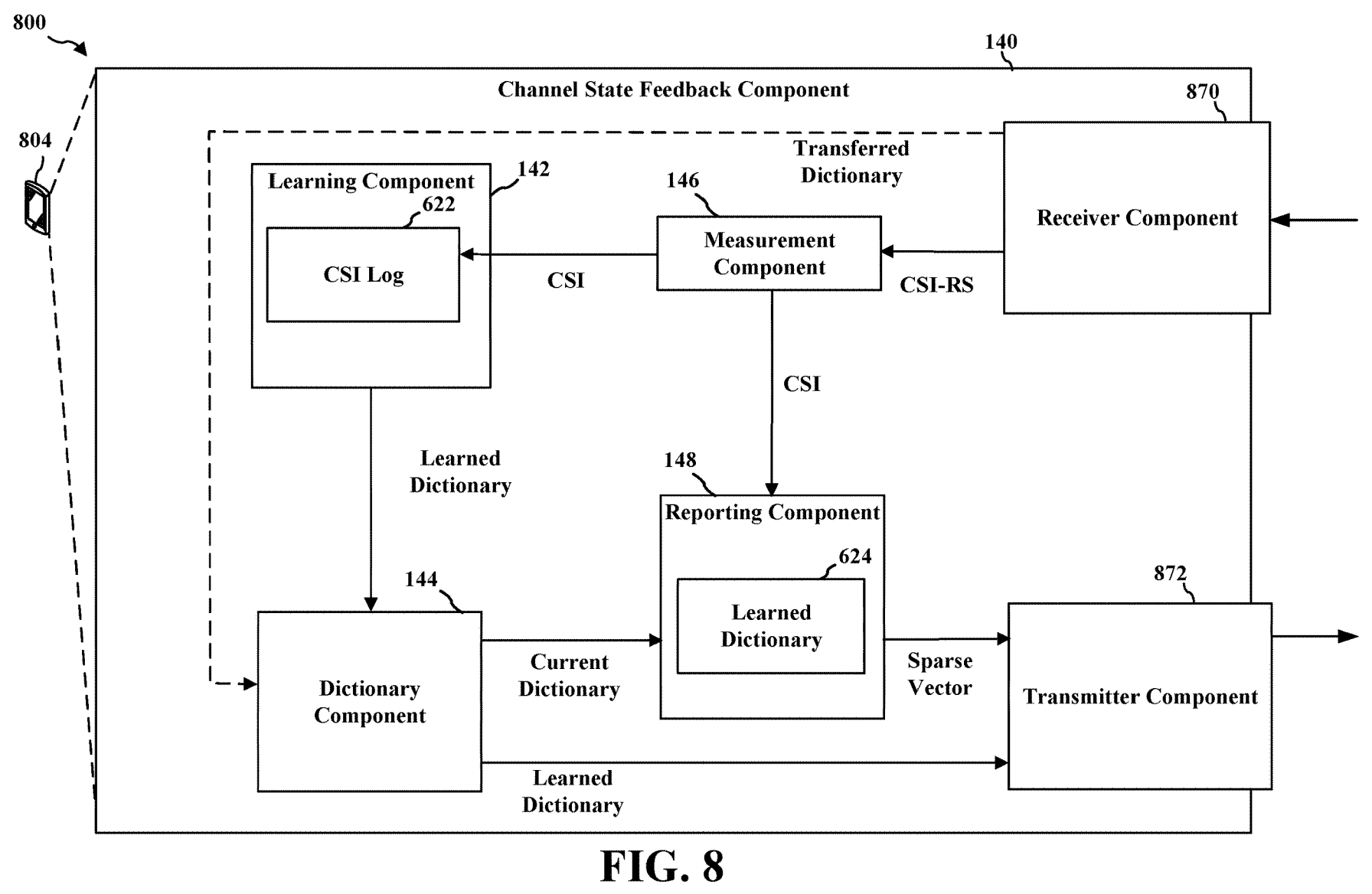

FIG. 8 is a conceptual data flow diagram 800 illustrating the data flow between different means/components in an example UE 804, which may be an example of the UE 104 and include the channel state feedback component 140. As discussed with respect to FIG. 1, the channel state feedback component 140 may include the learning component 142, the dictionary component 144, the measurement component 146, and the reporting component 148.

The UE 104 also may include a receiver component 870 and a transmitter component 872. The receiver component 870 may include, for example, a RF receiver for receiving the signals described herein. The transmitter component 872 may include for example, an RF transmitter for transmitting the signals described herein. In some implementations, the receiver component 870 and the transmitter component 872 may be co-located in a transceiver such as the Tx/Rx 354 in FIG. 3.

The receiver component 870 may receive downlink signals such as reference signal (e.g., CSI-RS). The receiver component 870 may provide the reference signals to the measurement component 146.

The measurement component 146 may receive the CSI-RS from the receiver component 870. The measurement component 146 may be configured to measure CSI based on the CSI-RS. For example, the measurement component 146 may calculate a channel estimate per antenna pair of transmit antenna at the base station 102 and receive antenna at the UE 104. In some implementations, the measurement component 146 may calculate a channel quality indicator (CQI) for each pair of transmit antenna at the base station 102 and receive antenna at the UE 104. The measurement component 146 may provide the CSI to the learning component 142 and/or the reporting component 148.

The learning component 142 may receive the CSI from the measurement component 146. The learning component 142 may store the CSI in a CSI log 622. In some implementations, the learning component 142 may determine training sets based on subsets of CSI in the CSI log 622. For example, a training set may include CSI measurements within a geographic area or within a period of time (e.g., time of day). The learning component 142 may train a learned dictionary based on input of a training set (e.g., H) based using the method 700 (FIG. 7). The learning component 142 may provide the learned dictionary to the dictionary component 144.

The dictionary component 144 may receive the learned dictionary from the learning component 142. In some implementations, the dictionary component 144 may receive a transferred dictionary from another UE or the base station. The dictionary component 144 may be configured to select a current dictionary. For example, the dictionary component 144 may select a most recent dictionary for a geographic area or time of day. When a new learned dictionary is selected, the dictionary component 144 may transmit the learned dictionary to the base station 102 via the transmitter component 872. In some implementations, the dictionary component 144 may share the learned dictionary with a nearby and similar UE via a sidelink channel (e.g., by transmitting a sidelink communication via the transmitter component 872). For instance, a nearby UE may be within a geographic distance such that the RF channel may be similar and a similar UE may be a same model of UE or have the same antenna configuration. The dictionary component 144 may configure the reporting component 148 with the current dictionary (e.g., learned dictionary 624).

The reporting component 148 may receive the configuration of the current dictionary from the dictionary component 144. The reporting component 148 may receive a CSI measurement from the measurement component 146. The reporting component 148 may encode the CSI using the learned dictionary 624. For instance, the reporting component 148 may calculate the sparse vector Z based on the CSI and D. The reporting component 148 may transmit the sparse vector Z by identifying indices of the non-zero elements and corresponding quantized values.

FIG. 9 is a flowchart of an example method 900 for a UE to perform CSI reporting using a learned dictionary. The method 900 may be performed by a UE (such as the UE 104, which may include the memory 360 and which may be the entire UE 104 or a component of the UE 104 such as the channel state feedback component 140, Tx processor 368, the Rx processor 356, or the controller/processor 359). The method 900 may be performed by the channel state feedback component 140 in communication with the feedback receiving component 120 of one or more base stations 102. Optional blocks are shown with dashed lines.

At block 910, the method 900 includes determining a learned dictionary for CSI reporting, the learned dictionary defining a set of sparse vectors. In some implementations, for example, the UE 104, the Rx processor 356, or the controller/processor 359 may execute the channel state feedback component 140 or the learning component 142 to determine a learned dictionary for CSI reporting, the learned dictionary defining a set of sparse vectors. In some implementations, at sub-block 912, for example, the block 910 may optionally include receiving a learned dictionary generated by a similar UE. For instance, the similar UE may be a same model as the UE 104 and the learned dictionary may be for a location within a threshold distance of the UE 104. In some implementations, at sub-block 914, the block 910 may include logging CSI during operation of the UE. In such implementations, at sub-block 916, the block 910 may include training the learned dictionary based on the logged CSI. Training the learned dictionary may include the method 700 discussed above with respect to FIG. 7. In some implementations, the sub-block 916 may include receiving a stopping criterion from the serving base station at sub-block 917. At sub-block 918, the sub-block 916 may include iterative hard thresholding for sparse PCA until the stopping criterion is satisfied. Accordingly, the UE 104, the Rx processor 356, or the controller/processor 359 executing the channel state feedback 140 or the learning component 142 may provide means for determining a learned dictionary for CSI reporting, the learned dictionary defining a set of sparse vectors.

At block 920, the method 900 includes indicating the learned dictionary to a serving base station. In some implementations, for example, the UE 104, the TX processor 368, or the controller/processor 359 may execute the channel state feedback component 140 or the dictionary component 144 to indicate the learned dictionary to a serving base station. In some implementations, at sub-block 922, the block 920 may include sharing the learned dictionary with the serving base station. In some implementations, at sub-block 924, the block 920 may include indicating a value of s when the sparse vector is s-sparse. Accordingly, the UE 104, the TX processor 368, or the controller/processor 359 executing the channel state feedback 140 or the dictionary component 144 may provide means for indicating the learned dictionary to a serving base station.

At block 930, the method 900 may optionally include sharing the learned dictionary with a nearby and similar UE via a sidelink channel. In some implementations, for example, the UE 104, the TX processor 368, or the controller/processor 359 may execute the channel state feedback component 140 or the dictionary component 144 to share the learned dictionary with a nearby and similar UE via a sidelink channel. Accordingly, the UE 104, the TX processor 368, or the controller/processor 359 executing the channel state feedback 140 or the dictionary component 144 may provide means for sharing the learned dictionary with a nearby and similar UE via a sidelink channel.

At block 940, the method 900 includes measuring CSI for a plurality of channels. In some implementations, for example, the UE 104, the Rx processor 356, or the controller/processor 359 may execute the channel state feedback component 140 or the measurement component 146 to measure CSI for a plurality of channels. Accordingly, the UE 104, the Rx processor 356, or the controller/processor 359 executing the channel state feedback 140 or the measurement component 146 may provide means for measuring CSI for a plurality of channels.

At block 950, the method 900 includes reporting a sparse vector representing the CSI based on the learned dictionary to the serving base station. In some implementations, for example, the UE 104, the TX processor 368, or the controller/processor 359 may execute the channel state feedback component 140 or the reporting component 148 to report a sparse vector representing the CSI based on the learned dictionary to the serving base station. In some implementations, for example, at sub-block 952, the block 950 may include sending indices of non-zero elements of the sparse vector and corresponding quantized values. Accordingly, the UE 104, the TX processor 368, or the controller/processor 359 executing the channel state feedback 140 or the dictionary component 144 may provide means for reporting a sparse vector representing the CSI based on the learned dictionary to the serving base station.

Figure 10:
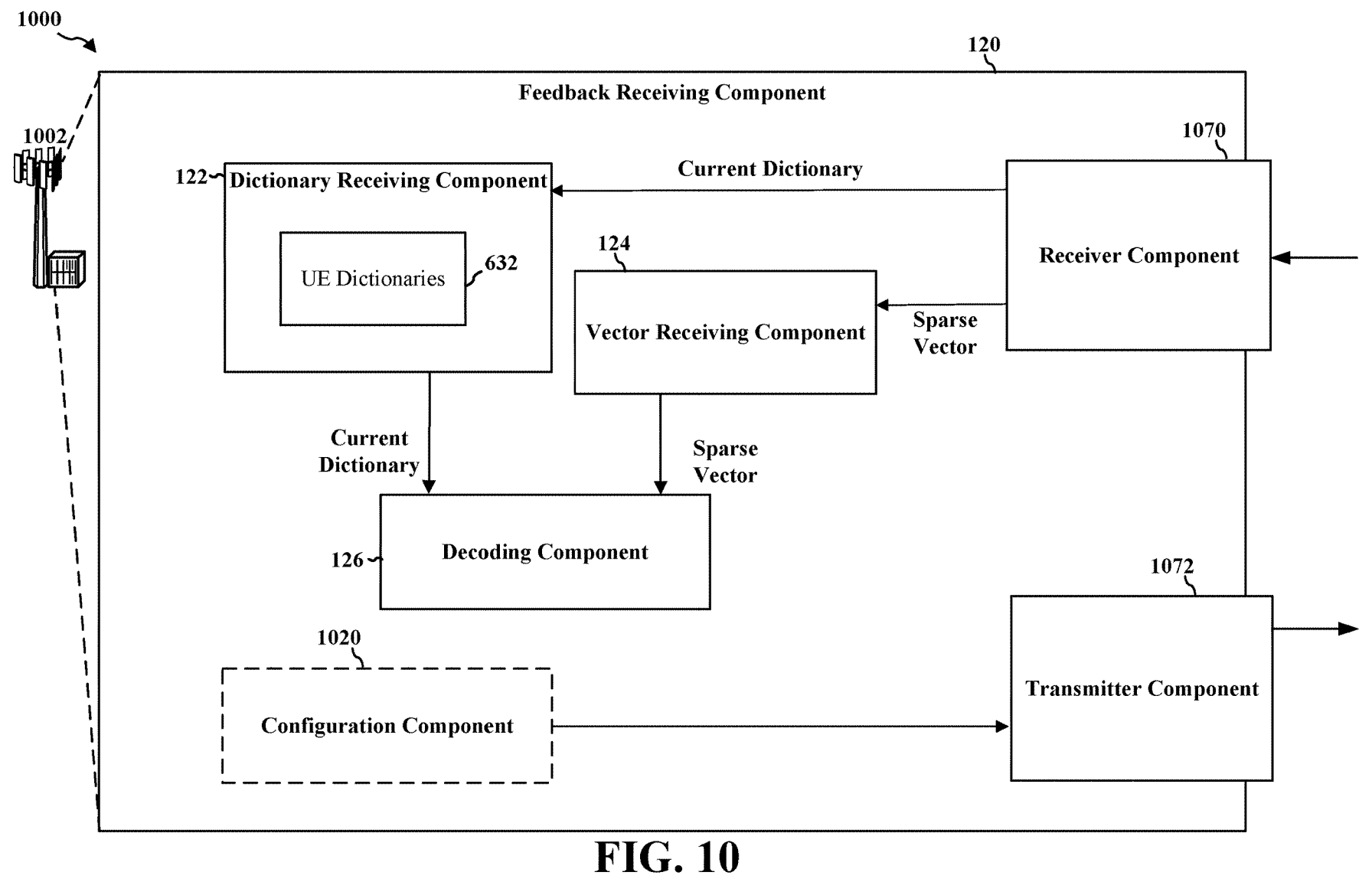

FIG. 10 is a conceptual data flow diagram 1000 illustrating the data flow between different means/components in an example base station 1002, which may be an example of the base station 102 and include the feedback receiving component 120. As discussed with respect to FIG. 1, the feedback receiving component 120 may include the dictionary receiving component 122, the vector receiving component 124, and the decoding component 126.

The base station 1002 also may include a receiver component 1070 and a transmitter component 1072. The receiver component 1070 may include, for example, a RF receiver for receiving the signals described herein. The transmitter component 1072 may include for example, an RF transmitter for transmitting the signals described herein. In some implementations, the receiver component 1070 and the transmitter component 1072 may be co-located in a transceiver such as the Tx/Rx 318 in FIG. 3.

The receiver component 1070 may receive uplink signals such as an indication of a dictionary and a sparse vector indicating CSI. The receiver component 1070 may provide the indication of the dictionary to the dictionary receiving component 122. The receiver component 1070 may provide the sparse vector to the vector receiving component 124.

The dictionary receiving component 122 may receive the indication of the dictionary from the receiver component 1070. In some implementations, the indication of the dictionary is a copy of the dictionary. For example, the dictionary receiving component 122 may receive a RRC message or a MAC-CE including the dictionary. In some implementations, the indication of the dictionary may be an identify of a dictionary that has previously been provided to the base station 102. For example, the indication may identify a dictionary generated by a similar UE. The dictionary receiving component 122 may store the dictionary and/or an association between the UE 104 and the dictionary in the UE dictionaries 632. The dictionary receiving component 122 may configure the decoding component 126 with the current dictionary for the UE 104.

The vector receiving component 124 may receive the sparse vector via the receiver component 1070. For example, the sparse vector may be received as uplink control information (UCI) received on a PUCCH or PUSCH. In some implementations, where the vector is indicated as indices of non-zero elements and corresponding quantized values, the vector receiving component 124 may generate a vector including all elements including the zero values. The vector receiving component 124 may provide the sparse vector the decoding component 126.

The decoding component 126 may receive the current dictionary from the dictionary receiving component 122. The decoding component 126 may receive the sparse vector from the vector receiving component 124. The decoding component 126 may be configured to decode the sparse vector based on the current dictionary for the UE 104. For example, the decoding component 126 may multiply each quantized value of the sparse matrix (z) times the corresponding atom (d) from the codebook (D) and add the resulting vectors to determine H.

In some implementations, the base station 1002 may optionally include a configuration component 1020. The configuration component may transmit various configuration information to a UE 104 via the transmitter component 1072. For example, the configuration component 1020 may share a learned dictionary (e.g., from a UE 104) with a similar UE. As another example, the configuration component 1020 may transmit a stopping criterion to the UE 104 for use in iterative hard thresholding to train the learned dictionary.

FIG. 11 is a flowchart of an example method 1100 for a base station to receive CSI reporting using a learned dictionary. The method 1100 may be performed by a base station (such as the base station 102, which may include the memory 376 and which may be the entire base station 102 or a component of the base station 102 such as the feedback receiving component 120, Tx processor 316, the Rx processor 370, or the controller/processor 375). The method 1100 may be performed by the feedback receiving component 120 in communication with the feedback receiving component 120 of one or more base stations 102. Optional blocks are shown with dashed lines.

At block 1110, the method 1100 may optionally include transmitting a stopping criterion to the UE for use in iterative hard thresholding to train the learned dictionary. In some implementations, for example, the base station 102, the Tx processor 316, or the controller/processor 375 may execute the feedback receiving component 120 or the configuration component 1020 to transmit a stopping criterion to the UE for use in iterative hard thresholding to train the learned dictionary. Accordingly, the base station 102, the Tx processor 316, or the controller/processor 375 executing the feedback receiving component 120 or the configuration component 1020 may provide means for transmitting a stopping criterion to the UE for use in iterative hard thresholding to train the learned dictionary.

At block 1120, the method 1100 includes receiving an indication of a learned dictionary for CSI reporting from a UE, the learned dictionary defining sparse vectors. In some implementations, for example, the base station 102, the Rx processor 370, or the controller/processor 375 may execute the feedback receiving component 120 or the dictionary receiving component 122 to receive an indication of a learned dictionary 624 for CSI reporting from a UE 104, the learned dictionary 624 defining sparse vectors. In some implementations, at sub-block 1122, the block 1120 may optionally include receiving a value of s when the sparse vector is s-sparse. The value of s may indicate the number of non-zero elements in the sparse vector. Accordingly, the base station 102, the Rx processor 370, or the controller/processor 375 executing the feedback receiving component 120 or the configuration component 1020 may provide means for receiving an indication of a learned dictionary for CSI reporting from a UE, the learned dictionary defining sparse vectors.

At block 1130, the method 1100 includes receiving, from the UE, a sparse vector representing CSI measured at the UE. In some implementations, for example, the base station 102, the Rx processor 370, or the controller/processor 375 may execute the feedback receiving component 120 or the vector receiving component 124 to receive, from the UE 104, a sparse vector 640 representing CSI 620 measured at the UE. For example, in some implementations, at sub-block 1132, the block 1130 may include receiving indices of non-zero elements of the sparse vector and corresponding quantized values. Accordingly, the base station 102, the Rx processor 370, or the controller/processor 375 executing the feedback receiving component 120 or the vector receiving component 124 may provide means for receiving, from the UE, a sparse vector representing CSI measured at the UE.

At block 1140, the method 1100 may optionally include sharing the learned dictionary with a similar UE. In some implementations, for example, the base station 102, the Tx processor 316, or the controller/processor 375 may execute the feedback receiving component 120 or the configuration component 1020 to share the learned dictionary with a similar UE. Accordingly, the base station 102, the Tx processor 316, the Rx processor 370, or the controller/processor 375 executing the feedback receiving component 120 or the configuration component 1020 may provide means for sharing the learned dictionary with a similar UE.

At block 1150, the method 1100 includes determining an estimated channel based on the sparse vector and the learned dictionary for the UE. In some implementations, for example, the base station 102, the Rx processor 370, or the controller/processor 375 may execute the feedback receiving component 120 or the decoding component 126 to determine an estimated channel based on the sparse vector 640 and the learned dictionary 624 for the UE. Accordingly, the base station 102, the Tx processor 316, the Rx processor 370, or the controller/processor 375 executing the feedback receiving component 120 or the decoding component 126 may provide means for determining an estimated channel based on the sparse vector and the learned dictionary for the UE.

The following numbered clauses provide an overview of aspects of the present disclosure:

1. A method of wireless communication for a user equipment (UE), comprising:
   determining a learned dictionary for channel state information (CSI) reporting, the learned dictionary defining a set of sparse vectors;
   indicating the learned dictionary to a serving base station;
   measuring CSI for a plurality of channels; and
   reporting a sparse vector representing the CSI based on the learned dictionary to the serving base station.
2. The method of clause 1, wherein determining the learned dictionary comprises receiving a learned dictionary generated by a similar UE.
3. The method of clause 2, wherein the similar UE is a same model as the UE and the learned dictionary is for a location within a threshold distance of the UE.
4. The method of any of clauses 1-3, wherein determining the learned dictionary comprises:
   logging CSI during operation of the UE; and
   training the learned dictionary based on the logged CSI.
5. The method of clause 4, wherein training the learned dictionary based on the logged CSI comprises iterative hard thresholding for sparse principal component analysis (PCA) until a stopping criterion is satisfied.
6. The method of clause 5, further comprising receiving the stopping criterion from the serving base station.
7. The method of any of clauses 4-6, wherein indicating the learned dictionary to the serving base station comprises sharing the learned dictionary with the serving base station.
8. The method of any of clauses 4-7, further comprising sharing the learned dictionary with a nearby and similar UE via a sidelink channel.

9. The method of any of clauses 1-8, wherein reporting the sparse vector comprises sending indices of non-zero elements of the sparse vector and corresponding quantized values.
10. The method of any of clauses 1-9, wherein indicating the learned dictionary comprises indicating a value of s when the sparse vector is s-sparse.
11. An apparatus of a user equipment (UE), comprising:
    a memory storing computer-executable instructions; and
    at least one processor coupled to the memory and configured to execute the computer-executable instructions to perform the method of any of clauses 1-10.
12. An apparatus of a user equipment (UE), comprising means for performing the method of any of clauses 1-10.
13. A non-transitory computer-readable medium storing computer-executable instructions that when executed by a processor of a user equipment (UE), cause the UE to perform the method of any of clauses 1-10.
14. A method of wireless communication for a base station, comprising:
    receiving an indication of a learned dictionary for channel state information (CSI) reporting from a user equipment (UE), the learned dictionary defines sparse vectors;
    receiving, from the UE, a sparse vector representing CSI measured at the UE; and
    determining an estimated channel based on the sparse vector and the learned dictionary for the UE.
15. The method of clause 14, further comprising sharing the learned dictionary with a similar UE.
16. The method of clause 15, wherein the similar UE is a same model as the UE and the learned dictionary is for a location within a threshold distance of the UE.
17. The method of any of clauses 14-16, further comprising transmitting a stopping criterion to the UE for use in iterative hard thresholding to train the learned dictionary.
18. The method of any of clauses 14-17, wherein receiving the sparse vector comprises receiving indices of non-zero elements of the sparse vector and corresponding quantized values.
19. The method of any of clauses 14-18, wherein receiving the indication of the learned dictionary comprises receiving a value of s when the sparse vector is s-sparse.
20. An apparatus of wireless communication for a base station, comprising:
    a memory storing computer-executable instructions; and
    at least one processor coupled to the memory and configured to execute the computer-executable instructions to perform the method of any of clauses 14-19.
21. An apparatus of a base station, comprising means for performing the method of any of clauses 14-19.
22. A non-transitory computer-readable medium storing computer-executable instructions that when executed by a processor of a base station, cause the base station to perform the method of any of clauses 14-19.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
determining a learned dictionary for channel state information (CSI) reporting, the learned dictionary defining a set of sparse vectors, wherein determining the learned dictionary comprises:
logging CSI during operation of the UE; and
training the learned dictionary, at the UE, based on the logged CSI, wherein training the learned dictionary, at the UE, based on the logged CSI comprises:
initializing a vector of sparse coefficients randomly;
selecting a vector of dictionary atoms that minimizes a difference between a matrix of logged CSI samples and a product of the vector of dictionary atoms and the vector of sparse coefficients;
updating the vector of sparse coefficients based on a product of the vector of dictionary atoms and the matrix of logged CSI samples;
using iterative hard thresholding on the vector of sparse coefficients; and
repeating the selecting updating and iterative hard thresholding until a stopping criterion is satisfied;
indicating the learned dictionary to a serving base station;
measuring CSI for a plurality of channels; and
reporting a sparse vector representing the CSI based on the learned dictionary to the serving base station.

2. The method of claim 1, further comprising: receiving a learned dictionary generated by a second UE that is a same model as the UE and the learned dictionary is for a location within a threshold distance of the UE.

3. The method of claim 1, wherein training the learned dictionary, at the UE, based on the logged CSI comprises iterative hard thresholding for sparse principal component analysis (PCA) until a stopping criterion is satisfied.

4. The method of claim 3, further comprising receiving the stopping criterion from the serving base station.

5. The method of claim 1, wherein indicating the learned dictionary to the serving base station comprises sharing the learned dictionary with the serving base station.

6. The method of claim 1, further comprising sharing the learned dictionary with a second UE having a same model and being within a threshold distance via a sidelink channel.

7. The method of claim 1, wherein reporting the sparse vector comprises sending indices of non-zero elements of the sparse vector and corresponding quantized values.

8. The method of claim 1, wherein indicating the learned dictionary comprises indicating a value of s when the sparse vector is s-sparse.

9. An apparatus of a user equipment (UE), comprising:
a memory storing computer-executable instructions; and
at least one processor coupled to the memory and configured to execute the computer-executable instructions to:
determine a learned dictionary for channel state information (CSI) reporting, the learned dictionary defining a set of sparse vectors, wherein to determine the learned dictionary, the at least one processor is configured to:
log CSI during operation of the UE; and
train the learned dictionary, at the UE, based on the logged CSI, wherein to train the learned dictionary based on the logged CSI, the at least one processor is configured to:
initialize a vector of sparse coefficients randomly;
select a vector of dictionary atoms that minimizes a difference between a matrix of logged CSI samples and a product of the vector of dictionary atoms and the vector of sparse coefficients;
update the vector of sparse coefficients based on a product of the vector of dictionary atoms and the matrix of logged CSI samples;
use iterative hard thresholding on the vector of sparse coefficients; and
repeat the selecting updating and iterative hard thresholding until a stopping criterion is satisfied;
indicate the learned dictionary to a serving base station;
measure CSI for a plurality of channels; and
report a sparse vector representing the CSI based on the learned dictionary to the serving base station.

10. The apparatus of claim 9, wherein the at least one processor is further configured to receive a learned dictionary generated by a second UE that is a same model as the UE and the learned dictionary is for a location within a threshold distance of the UE.

11. The apparatus of claim 9, wherein to train the learned dictionary, at the UE, based on the logged CSI, the at least one processor is configured to perform iterative hard thresholding for sparse principal component analysis (PCA) until the stopping criterion is satisfied.

12. The apparatus of claim 11, wherein the at least one processor is configured to receive the stopping criterion from the serving base station.

13. The apparatus of claim 11, wherein to indicate the learned dictionary to the serving base station, the at least one processor is configured to share the learned dictionary with the serving base station.

14. The apparatus of claim 11, wherein the at least one processor is configured to share the learned dictionary with a second UE having a same model and being within a threshold distance via a sidelink channel.

15. The apparatus of claim 9, wherein to report the sparse vector, the at least one processor is configured to send indices of non-zero elements of the sparse vector and corresponding quantized values.

16. The apparatus of claim 9, wherein to indicate the learned dictionary, the at least one processor is configured to indicate a value of s when the sparse vector is s-sparse.

\* \* \* \* \*